Feb. 10, 1970    H. C. HARBERS    3,494,629
SPRING SUSPENSION ASSEMBLY
Filed May 10, 1967

HENRY C. HARBERS
INVENTOR.

BY
ATTORNEYS () # United States Patent Office 3,494,629
Patented Feb. 10, 1970

3,494,629
SPRING SUSPENSION ASSEMBLY
Henry C. Harbers, Pasadena, Calif., assignor to Western Unit Corporation, City of Industry, Calif., a corporation of California
Filed May 10, 1967, Ser. No. 637,574
Int. Cl. B62d 53/08
U.S. Cl. 280—125                           4 Claims

ABSTRACT OF THE DISCLOSURE

A fifth wheel spring suspension dolly assembly having an X-shaped main frame coupled to a carriage by spring means. An antifriction fifth wheel bearing unit is readily and detachably secured to the outer end of the X-shaped main frame by simple fastener means enabling the fifth wheel to be replaced and/or serviced as a unit quickly and inexpensively.

---

This invention relates to an improved, simplified, spring suspension assembly for use in supporting one end of a vehicle. In lieu of a box-like rigid frame heretofore employed between the vehicle and spring suspension means carried by the carriage axle there is provided a lightweight cross-shaped main frame the pairs of arms of which extend diagonally between the fore and aft ends of the spring suspension members along the opposite sides of the assembly and rigidly interconnected in the area of cross-over. The spring suspension assemblies have their midportions rigidly connected to the adjacent ends of the carriage axle and their ends supported in bracket means carried by the outer ends of the cross-shaped main frame. Desirably, the forward pair of brackets include a drawbar hinge assembly for convenience in connecting a drawbar to the suspension assembly. Another feature of the suspension assembly is the provision of a fifth wheel subassembly comprising a pair of concentric ring units journalled in one another and the lower one of which is rigidly connected to the outer end portions of the cross-shaped main frame thereby serving to interconnect and reinforce the main frame. The upper one of the ring units is adapted to support the forward end of a trailer or the like.

The present invention makes possible the elimination of a substantial amount of structural material heretofore thought essential without sacrifice in the rigidity, strength and ruggedness of the suspension assembly. Such suspension units are constructed as unitary assemblies adapted to be assembled as a unit to a wide range of chassis frames or directly to one end of a vehicle body. Heretofore, it has been customary to provide a generally rectangular main frame the opposite sides of which are provided with hanger brackets connectible with the opposite ends of the suspension spring. The rectangular main frame must be of heavy construction and suitably reinforced by cross bracing and include provision for supporting the fifth wheel bearing assembly. Various proposals have been made for reducing the amount and weight of material required for these main frames. However, these efforts have not been particularly successful prior to the present invention utilizing a unique cross-shaped hollow main frame having its principal components extending diagonally between the fore and aft ends of the spring suspension units along either side of the assemblies. The rigid interconnection of these diagonal members in the area of cross-over adds greatly to the rigidity of the frame and provides maximum ruggedness with minimum use of material. Additionally, this frame may be further strengthened by rigidly securing each of the arms of the main frame to one of the ring units of a fifth wheel subassembly. A further feature is the use of unitary drawbar hinge and hanger brackets at the outer forward corners of the suspension assembly.

Accordingly, it is a primary object of the present invention to provide lighter-weight more rugged spring suspension assembly for use on vehicles.

Another object of the invention is the provision of a lightweight high-strength main frame and suspension assembly for securement directly to the opposite ends of a carriage axle and attachable directly to a chassis frame or to a fifth wheel subassembly.

Another object of the invention is the provision of a simple, rugged lightweight spring suspension fifth wheel dolly assembly having simple fifth wheel sub-unit which can be replaced and serviced as a unit quickly and inexpensively.

More specifically, it is an object of the present invention to provide a carriage suspension assembly featuring a unitary cross-shaped frame having its arms extending diagonally between the fore and aft ends of the resilient spring means carried by a carriage axle.

These and other more specific objects will appear upon reading the following specification and claims and upon considering in connection therewith the attached drawing to which they relate.

Referring now to the drawing in which a preferred embodiment of the invention is illustrated.

Figure 1:
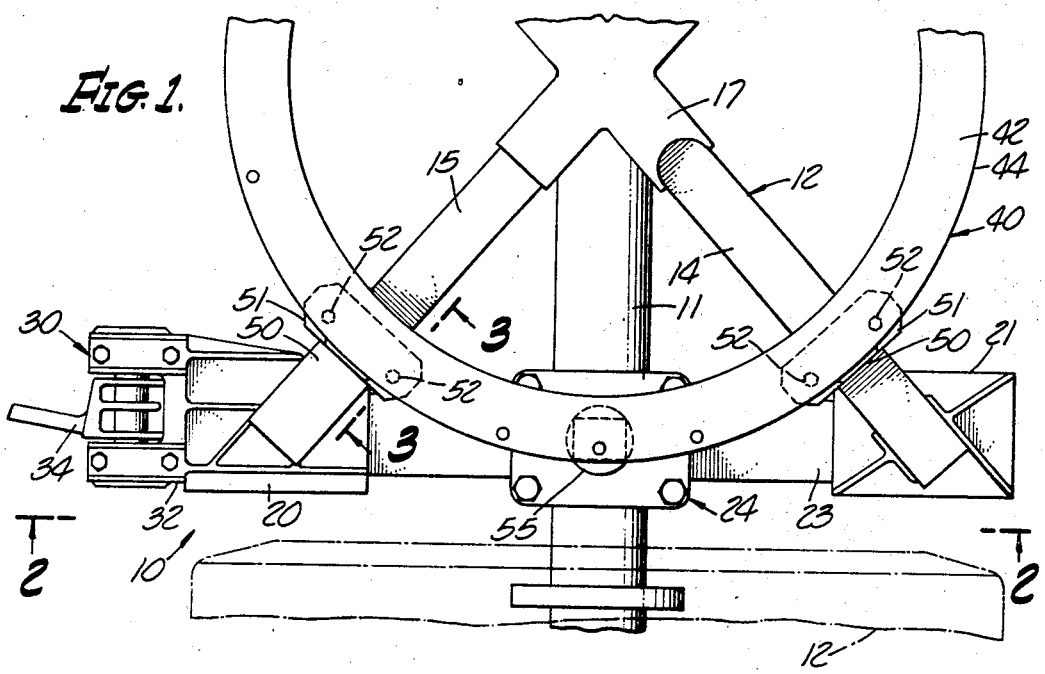
FIGURE 1 is a fragmentary top plan view of one preferred embodiment of the invention.
Figure 2:
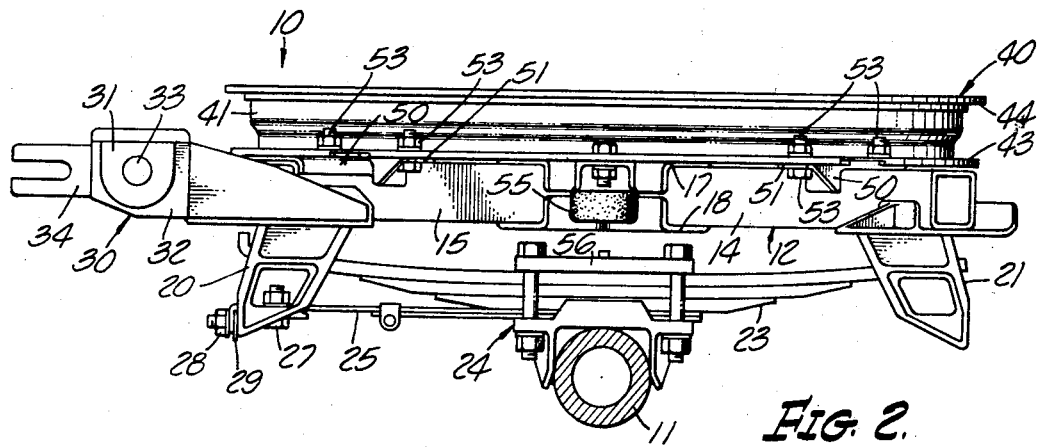
FIGURE 2 is a vertical sectional view taken along line 2—2 of FIGURE 1.

Referring initially more particularly to FIGURES 1 and 2 there is shown one preferred embodiment of the invention designated generally 10 and including a fifth wheel sub-unit. The spring suspension assembly there shown includes a carriage axle 11 to the opposite ends of which carriage wheels 12 are secured in any manner well known to those skilled in this art. Overlying axle 11 is a cross-shaped main frame 12 here shown as comprising a pair of tubular members 14, 15 intersecting one another centrally of the suspension assembly. It will, therefore, be understood that this main frame consists of four tubular arms welded or otherwise securely fixed together in a central junction area and desirably reinforced as by a pair of cross-shaped castings or steel stampings 17, 18 sized to have a snug fit about the upper and lower portions of the junctions of tubular members 14, 15. Reinforcing plates 17 and 18 are welded or otherwise rigidly secured to the four arms and cooperate therewith in prviding a high-strength, hollow, rigid main frame 12.

Rigidly secured to the outer end of each of the main frame arms 14, 15 are suitable hanger brackets 20, 21. These project downwardly from the forward and rear ends respectively of the main frame and provide means for transferring the load carried by the main frame to the carriage axle through any suitable spring suspension means such as the spring beam 23, it being understood that air springs or a combination of air and beam springs are equally suitable. As here shown, by way of example, spring beam 23 comprises several spring leaves having their midportions rigidly clamped to the opposite ends of carriage axle 11 by conventional clamping means 24. As here shown, the opposite ends of spring beam 23 extend through openings provided in brackets 20 and 21 and bear upwardly against seating surfaces carried by these brackets in a manner well known in this art. Means for transmitting draft forces between the forward bracket 20 and axle 11, herein illustrated by way of example, comprises a spring draft link 25 having its rear end secured to the axle by clamp 24 and its forward end secured to brackets 20 by bolts 27, 28. Desirably, shims 29 are utilized as shown in FIGURE 2 to facilitate alignment of the carriage axle to lie normal to the longitutinal center line of the chassis.

A further feature of the invention is the fact that the forward pair of hangers 20 preferably include a pair of drawbar hinges 30 as a unitary part thereof. Desirably, hinge 30 is of the type utilizing compressed elastomeric cushion means 31 to socket the opposite ends 33 of the T-shaped member 34 crosswise between the legs of the U-shaped main body 32. The drawbar proper, not shown, is connectible to the forwardly projecting stem of the T-shaped member 34. The details of this drawbar hinge are shown in greater detail in my Patent 2,996,313 granted Aug. 15, 1961.

Figure 3:
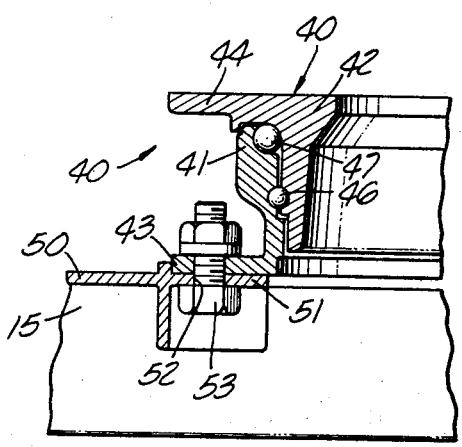
FIGURE 3 is a fragmentary cross-sectional view on enlarged scale taken along line 3—3 on FIGURE 1.

Another important feature of the invention is the provision of a simple but rugged fitfh wheel sub-unit 40 here shown as comprising a first or lower ring 41 and a second or upper ring 42 having respective radial flanges 43, 44 and concentrically arranged axial flanges best shown in FIGURE 3. The latter are preferably formed with a pair of cooperating raceways seating rings of anti-friction elements, such as the ball bearings 46, 47 arranged to be load radially as well as in axial thrust.

The fifth wheel sub-unit 40 is rigidly secured to main frame 12 in the manner shown in FIGURES 1, 2 and 3. Each arm of this frame is provided with a saddle shaped bracket 50 shaped to embrace the top side of main frame arm. Projecting laterally from either side of brackets 50 are tangs 51 provided with openings 52 to receive bolts 53 serving to rigidly secure flange 43 of lower ring 41 to main frame 12.

From the foregoing it will be understood that the fifth wheel unit 40 is not only rigidly secured to and supported by each of the arms of the main frame 12 but co-operates in providing highly effective reinforcing and strengthening for main frame 12. If desired, portions of the fifth wheel overlying axle 11 may be provided with a rubber bumper or snubber 55 (FIGURE 2) positioned to engage clamping plate 56 of the spring clamp 24 to limit the deflection of the spring beams or sidewise tilt of the load.

While the particular spring suspension assembly herein shown and disclosed in detail is fully capable of attaining the objects and providing the advantages hereinbefore stated, it is to be understood that it is merely illustrative of the presently preferred embodiments of the invention and that no limitations are intended to the details of construction of design herein shown other than as defined in the appended claims.

I claim:

1. A fifth wheel spring suspension assembly adapted for use in supporting the forward end of a semi-trailer or the like, said suspension assembly being characterized by the vertical compactness thereof and the simplicity with which the fifth wheel sub-unit thereof can be serviced and replaced, said suspension assembly comprising a carriage having elongated first and second spring means secured crosswise of the opposite ends thereof, a pair of rigid arms extending crosswise of one another rigidly secured together at their point of crossover and including means operatively connecting their opposite ends to the forward end of said first spring and the rear end of said second spring, and a unitary fifth wheel sub-unit comprising a pair of concentric bearing rings held separated in load-bearing relation to one another by a ring of rolling anti-friction bearing elements, and readily separable fastener means for rigidly and detachably securing said fifth wheel sub-unit immovably to the outer end of each of said rigid pair of arms and, upon removal, permitting said first and second bearing rings to be removed as a unitary assembly from the remainder of said suspension assembly.

2. A fifth wheel assembly as defined in claim 1 characterized in that said pair of rigid arms comprises elongated tubular members lying substantially in a common horizontal plane.

3. A fifth wheel assembly as defined in claim 1 characterized in that said fifth wheel means includes a plurality of rings of anti-friction bearing members arranged between juxtaposed raceway surfaces formed on facing portions of said first and second rings.

4. A spring suspension assembly as defined in claim 1 characterized in hanger brackets at the corresponding ends of said spring means include as a unitary part thereof a pair of drawbar hinge the provision of bracket means embracing the upper sides of said rigid arms and fixed thereto, said bracket means being interposed between said arms and one of said first and second bearing rings, and said fastener means being effective to secure said one bearing ring to said rigid arms by way of said bracket means.

References Cited

UNITED STATES PATENTS

| 3,185,496 | 5/1965 | Harbers | 280—125 |
| 1,920,390 | 8/1933 | Helms | 280—125 |
| 1,743,436 | 1/1930 | Davis | 280—125 |

PHILIP GOODMAN, Primary Examiner

U.S. Cl. X.R.

280—433

UNITED STATES PATENT OFFICE
CERTIFICATE OF CORRECTION

Patent No. 3,494,629  February 10, 1970

Henry C. Harbers

It is certified that error appears in the above identified patent and that said Letters Patent are hereby corrected as shown below:

Column 4, line 31, beginning with "hanger brackets" cancel all to and including "pair of drawbar hinge" in line 33, same column 4.

Signed and sealed this 15th day of December 1970.

(SEAL)
Attest:

Edward M. Fletcher, Jr.

Attesting Officer

WILLIAM E. SCHUYLER, JR.

Commissioner of Patents